(12) United States Patent
Yoshida

(10) Patent No.: US 8,086,663 B2
(45) Date of Patent: Dec. 27, 2011

(54) NETWORK DEVICE AND CONTROL METHOD THEREOF AND NETWORK SYSTEM

(75) Inventor: Hiroyoshi Yoshida, Tokyo (JP)

(73) Assignee: Canon Kabushiki Kaisha (JP)

( * ) Notice: Subject to any disclaimer, the term of this patent is extended or adjusted under 35 U.S.C. 154(b) by 119 days.

(21) Appl. No.: 12/397,501

(22) Filed: Mar. 4, 2009

(65) Prior Publication Data

US 2009/0254602 A1    Oct. 8, 2009

(30) Foreign Application Priority Data

Apr. 7, 2008    (JP) .................. 2008-099801

(51) Int. Cl.
*G06F 15/16*    (2006.01)
*G06F 15/173*    (2006.01)
*G05B 11/01*    (2006.01)

(52) U.S. Cl. ........... 709/202; 709/205; 709/226; 700/19

(58) Field of Classification Search .................... 709/202
See application file for complete search history.

(56) References Cited

U.S. PATENT DOCUMENTS

| | | | |
|---|---|---|---|
| 5,953,312 A * | 9/1999 | Crawley et al. ............... | 370/218 |
| 6,292,838 B1 * | 9/2001 | Nelson .......................... | 709/236 |
| 2002/0026511 A1 * | 2/2002 | Garcia-Luna-Aceves et al. ............................. | 709/226 |
| 2007/0027970 A1 * | 2/2007 | Backman et al. ............. | 709/223 |

FOREIGN PATENT DOCUMENTS

| | | |
|---|---|---|
| JP | 2000-59560 A | 2/2000 |
| WO | WO 2004057831 A1 * | 7/2004 |
| WO | WO 2007022875 A1 * | 3/2007 |

* cited by examiner

*Primary Examiner* — Jeffrey Pwu
*Assistant Examiner* — Jasmine Myers
(74) *Attorney, Agent, or Firm* — Rossi, Kimms & McDowell LLP

(57) ABSTRACT

If an instruction of a predetermined function is given at a device A in a network, the device A issues a notification request for inquiring whether or not it is possible to execute the function to devices B, C and D in a list of devices capable of cooperating with the device A. The device B receives the request and if the device B can not execute the function, then the device B issues a notification request including the search path of the device B to devices E, F and G included in a list of the device B. If the device B receives a response including a search path through the device E that can execute the function, from the device E, then the search path of the device B is added to the response and the response is sent to the device A.

8 Claims, 14 Drawing Sheets

NEIGHBORING DEVICE LIST OF DEVICE A

| NEIGHBORING DEVICE 1 | NEIGHBORING DEVICE 2 | NEIGHBORING DEVICE 3 |
|---|---|---|
| B | C | D |

NEIGHBORING DEVICE LIST OF DEVICE B

| NEIGHBORING DEVICE 1 | NEIGHBORING DEVICE 2 | NEIGHBORING DEVICE 3 |
|---|---|---|
| E | F | G |

NEIGHBORING DEVICE LIST OF DEVICE C

| NEIGHBORING DEVICE 1 | NEIGHBORING DEVICE 2 | NEIGHBORING DEVICE 3 |
|---|---|---|
| A | B | |

FIG. 20

NEIGHBORING DEVICE LIST OF DEVICE A

| NEIGHBORING DEVICE | FUNCTION BIT |
|---|---|
| B | 110001001 |
| C | 100000001 |
| D | 110000001 |

※ FUNCTION BIT ARRAY : Bit8 - bit0

FIG. 21

| FUNCTION BIT | SIGNIFICATION |
|---|---|
| 0 | SCANNER |
| 1 | |
| 2 | |
| 3 | COLOR PRINTING |
| 4 | REVERSE SEQUENCE PRINTING |
| 5 | RING BINDING |
| 6 | SADDLE STITCHING AND STAPLING |
| 7 | STAPLING |
| 8 | DOUBLE-SIDED PRINTING |

FIG. 22

NEIGHBORING DEVICE LIST OF DEVICE B

| NEIGHBORING DEVICE | DEVICE ALLOWED TO BE SEARCHED |
|---|---|
| E | A |
| F | A, E |
| G | |

NETWORK DEVICE AND CONTROL METHOD THEREOF AND NETWORK SYSTEM

BACKGROUND OF THE INVENTION

1. Field of the Invention

The present invention provides technology to realize an objective function through cooperation with a plurality of devices through a network.

2. Description of the Related Art

In recent years, in a multi-function processing apparatus (MFP: Multi functional peripheral) functioning as a scanner, facsimile device, printer device, and further as storage, not only increasing the number of functions on a single apparatus but causing apparatuses to cooperate with each other over a network to provide new functions is being proposed. In such a cooperative operation of functions, when determining apparatuses to cooperate with each other, in addition to the functions held by each apparatus, positional relationships between each apparatus based on position information of those apparatuses is significant. Here, in Japanese Patent Laid-Open No. 2000-059560, in a network printing system, in order to search for a printer on the same floor, a method of causing a user to input position information, etc., of a printer is discussed.

However, in a method in which a user inputs, maintenance is troublesome, and because it is necessary for a user to determine a setting location for each apparatus, the load on a user becomes large. Also, a method of automatically creating position information is too ambitious, and further, there are problems such as being unable to consider operation conditions rather than actual distances between apparatuses. In other words, even if two apparatuses are closely arranged, because those apparatuses may possess different structures or cost-bearing origins, when determining apparatuses to cooperate based solely on distance between them, there is a possibility that there will be problems in actual operation.

SUMMARY OF THE INVENTION

An aspect of the present invention is to eliminate the above-mentioned problems with the conventional technology.

A characteristic of the present invention is to store a list of other devices with which a device can cooperate with and execute a function, and if an instruction to execute a predetermined function is given, inquire whether or not the predetermined function is executable in a device in the list. Then, technology which determines a device which can cooperate and execute the function based on the result of the inquiry and executes the desired function is provided.

According to an aspect of the present invention, there is provided a network device capable of executing a function in cooperation with another device through a network, comprising, a storage unit configured to store a list of devices capable of executing a process in cooperation with the network device; an inquiry unit configured to, if an instruction to execute a predetermined function is given, issue a notification request that inquires whether or not the predetermined function is capable of being executed in a device included in the list stored in the storage unit; and a processing unit configured to, based on a response received through the network in response to the notification request, execute the predetermined function in cooperation with a device included in the list which sent the response, or with a device that is not included in the list and identified by the response.

According to an aspect of the present invention, there is provided a control method of a network device capable of executing a function in cooperation with another device through a network, comprising: an inquiry step of issuing a notification request for inquiring whether or not a predetermined function can be executed to a device included in a list stored in a storage unit, in a case that an instruction to execute the predetermined function is given, wherein the list stores devices capable of executing processing in cooperation with the network device through the network; and a processing step of, based on a response received through the network executing in response to the notification request, executing the predetermined function in cooperation with the device included in the list which sent the response, or with a device that is not included in the list and identified by the response.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20 depicts a diagram illustrating an example of capability information received from a device in a neighboring device list of a device A according to a fourth exemplary embodiment.

FIG. 21 depicts a diagram describing the meaning of each bit in function information according to the fourth embodiment.

FIG. 22 depicts a diagram illustrating an example of a neighboring device list of a device B according to a fifth exemplary embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

<Device Network Arrangement Diagram>

Figure 1:
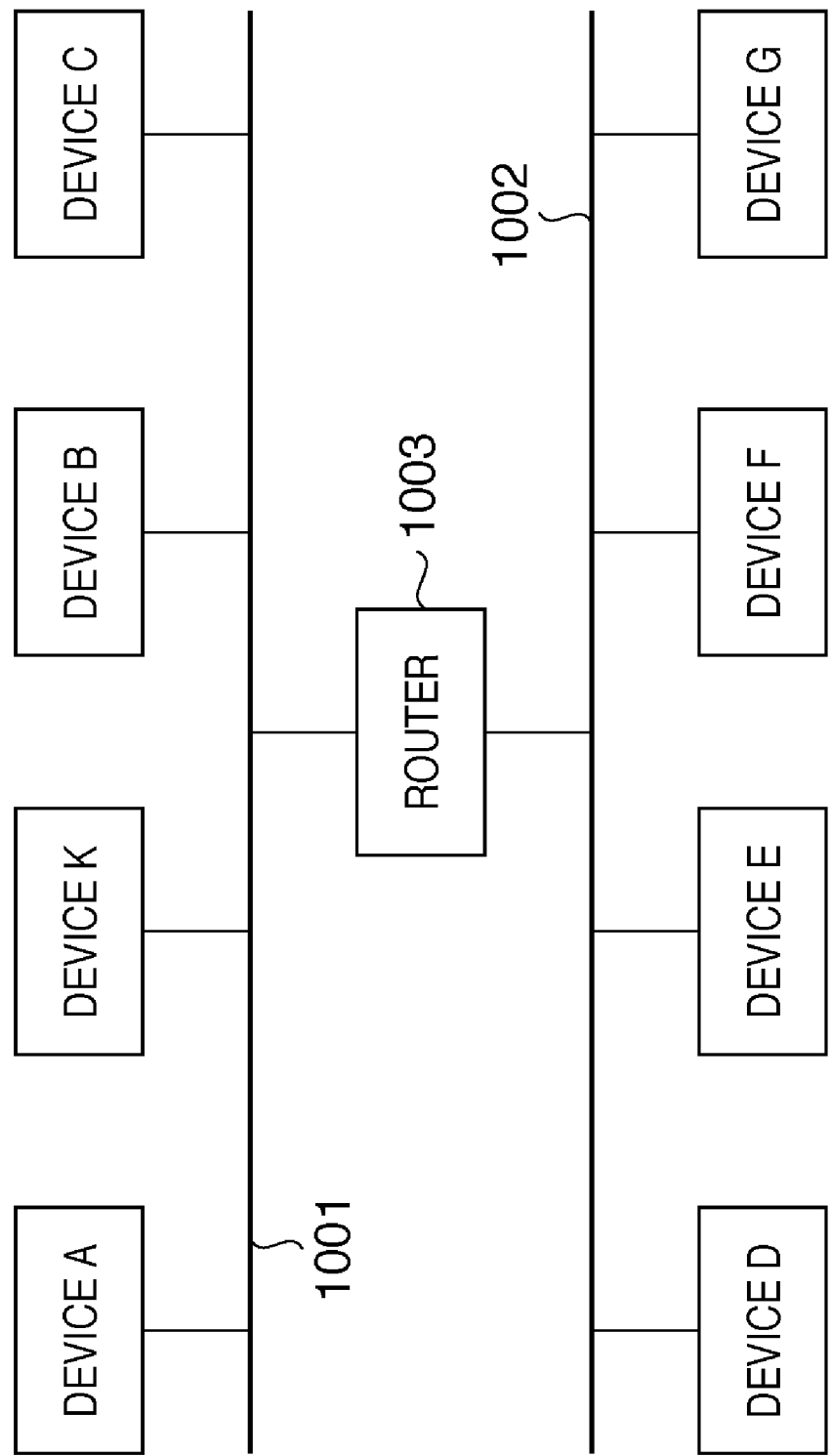
FIG. 1 depicts a diagram describing a network arrangement according to an exemplary embodiment.

FIG. 1 depicts a diagram describing an arrangement of network apparatuses (hereinafter, devices) of a network system according to the present embodiment. The network according to the embodiment functions as a network printing system, but the present invention is not limited to this.

As illustrated in the diagram, devices A, K, B, and C are connected to a network 1001, and devices D, E, F, and G are connected to a network 1002. These two networks 1001 and 1002 are connected via a router 1003. Also, the device K has a different manager than managers of the rest of the devices. Also, only the sheet discharge unit of the device E includes a saddle stitch staple function in addition to sort, staple, etc.

In the present exemplary embodiment, the device A (first device) has a list (neighboring device list) of devices with which the device A can cooperate and execute functions. When an instruction to execute a function in the device A is given, whether or not the function can be executed in the device B (second device) listed in the neighboring device list is inquired. Here, if the device B cannot execute the function, whether or not the function can be executed in a device listed in the neighboring device list of the device B is inquired again. By repeating such a process, a device which can realize the desired function through cooperation with the device A is found, and the device A can execute the desired function in cooperation with the found device. This neighboring device list is determined by a user in advance in consideration of the physical positions and operation of the devices, and is not necessarily subject to the actual positional arrangement of each device. Thus, a characteristic of finding a device with which cooperative operation is possible from device positions and operations through simple setting, and executing cooperative processing between the devices is obtained. Moreover, the neighboring device list stored in the device A has devices with high priority as devices for cooperation targets with respect to the device A. However, devices included in the neighboring device list stored in the device B may also be cooperated with by the device A. By applying such use of lists, there is no need for each device to have a large amount of device information. Also, when cooperative processing cannot be executed with a device stored in a device's own list, cooperating processing can be made efficient by searching devices in other device lists.

<Explanation of an MFP>

Figure 2:
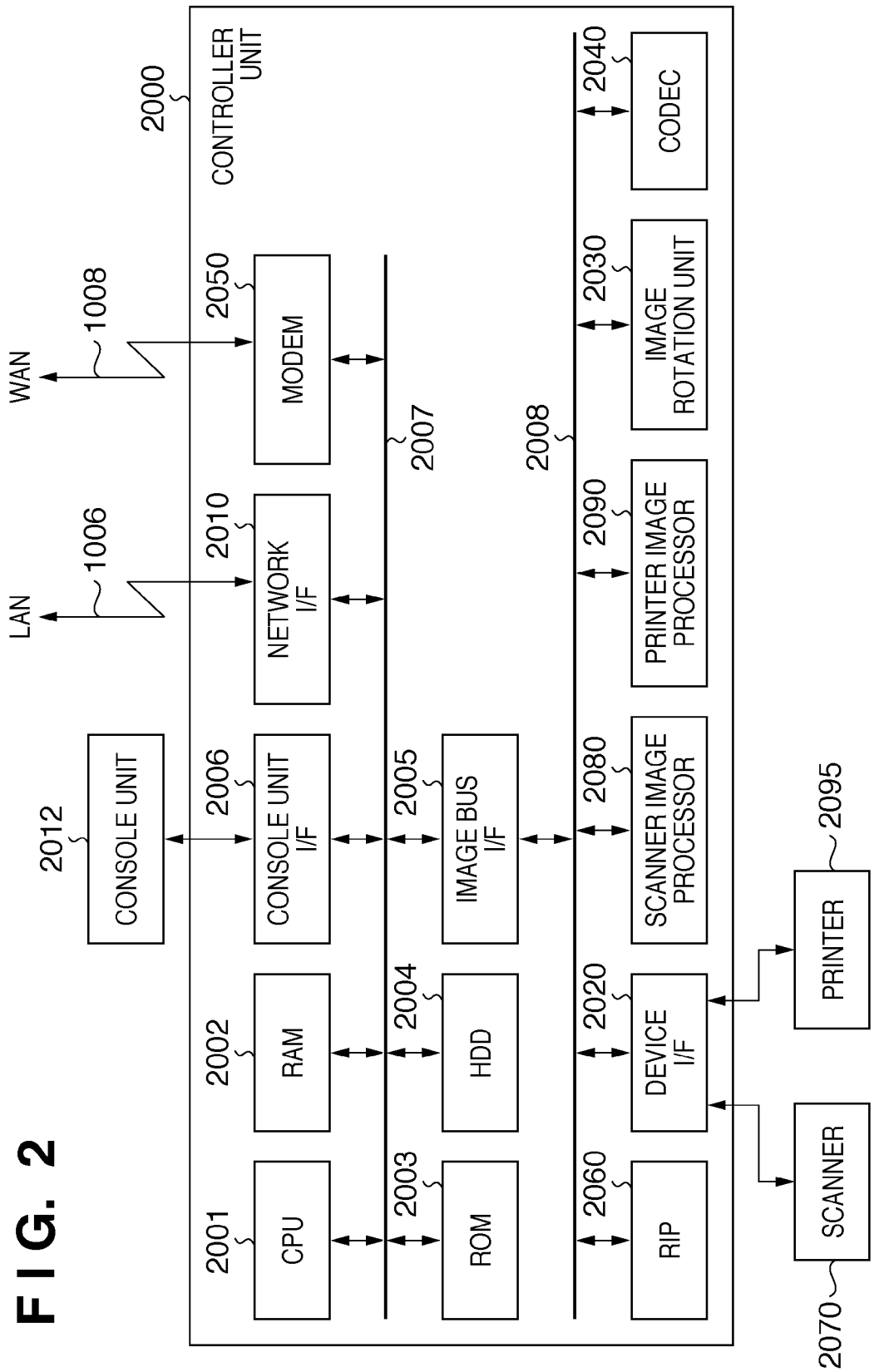
FIG. 2 depicts a block diagram illustrating a composition of a principle part of an MFP (multi-functional peripheral) according to the present embodiment.

FIG. 2 depicts a block diagram illustrating a composition of a principle part of an MFP (multi-function processing device) which is an example of a network device according to the present embodiment. This composition of a principle part of the MFP is common to all of devices A through G, and K in FIG. 1.

The MFP includes a controller unit 2000, and a scanner 2070 which is an image input device and a printer 2095 which is an image output device are connected to the controller unit 2000, and a console unit 2012 is also connected. The controller unit 2000 executes control to realize a copy function which prints based on image data from the scanner 2070 by the printer 2095. In addition, control to execute input and output of image data and device information is executed by connecting to a LAN 1006 (corresponding to a network 1001 of FIG. 1) or public line 1008 (WAN).

The controller unit 2000 has a CPU 2001, and the CPU 2001 starts up an operation system (OS) by a boot program stored in a ROM 2003. On this OS, programs stored in an HDD (hard disk drive) 2004 are executed, and by this, each type of processing is executed. This CPU 2001 uses a RAM 2002 as a work area. The RAM 2002 provides a work area, as well as an image memory area for temporarily storing image data. The HDD 2004 also functions as a storage unit which stores the aforementioned application programs or image data, or the neighboring device lists hereinafter described.

To the CPU 2001, a ROM 2003 and RAM 2002 are connected, along with a console unit I/F 2006, network I/F 2010, modem 2050 and image bus I/F 2005. The console unit I/F 2006 is an interface to the console unit 2012 having a touch panel, and outputs image data to be displayed on the console unit 2012 to the console unit 2012. Also, the console unit I/F 2006 sends information input by a user on the console unit 2012 to the CPU 2001. The network I/F 2010 is connected to the LAN 1006, and executes input and output of information between each device on the LAN 1006 through the LAN 1006. The modem 2050 is connected to the public line 1008, and executes input and output of information through the public line 1008.

The image bus I/F 2005 connects a system bus 2007 and an image bus 2008 which forwards image data at high speed, and is a bus bridge for converting data forms. The image bus 2008 is comprised of a PCI bus or an IEE 1394. On the image bus 2008 are a raster image processor (hereinafter, RIP) 2060, device I/F 2020, printer image processor 2090, image rotation unit 2030, and image compression/expansion unit (Codec) 2040.

The RIP 2060 is a processor which renders a PDL code into a bitmap image. The scanner 2070 and printer 2095 are connected to the device I/F 2020, and the device I/F 2020 executes conversion between synchronous and asynchronous systems. The scanner image processor 2080 executes correction, processing and editing on input image data. The printer image processor 2090 executes correction, resolution conversion, etc., according to the printer 2095 on print image data. The image rotation unit 2030 executes rotation of image data. The Codec 2040 compresses multiple-value image data to JPEG data, and 2-value image data to JBIG, MMR, MH, etc., data, as well as executes those expansion processes. The LAN 1006 corresponds to the network 1001 or 1002 in FIG. 1.

Next, the hardware compositions of the scanner 2070 and printer 2095 will be explained with reference to FIG. 3.

Figure 3:
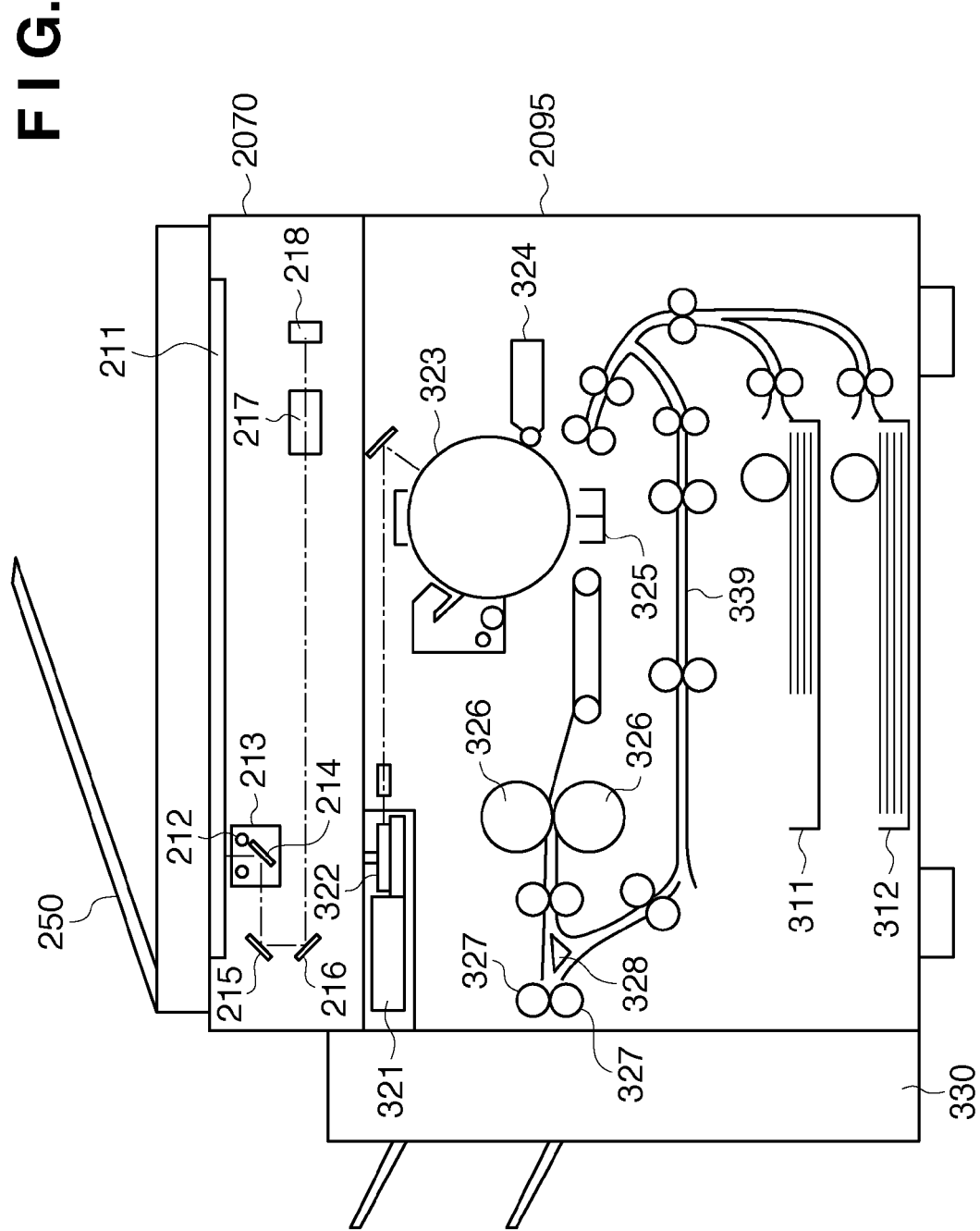
FIG. 3 depicts a side cross-section diagram illustrating a composition of the hardware of the MFP according to the present embodiment.

FIG. 3 depicts a side cross-section diagram illustrating a composition of the hardware of an MFP according to the present embodiment.

The scanner 2070 and printer 2095 have a general composition, as shown in FIG. 3. The scanner 2070 has a document feeding unit 250, and the document feeding unit 250 feeds a document sheet one at a time from the top onto a platen glass 211, and every time reading operation of each sheet is complete, that the sheet is discharged from the platen glass 211 to a discharge tray (not shown). When the scanner 2070 feeds a document sheet to the platen glass 211, a lamp 212 is lit and movement of a moving unit 213 is begun. Read scanning of the document sheet on the platen glass 211 is executed by the movement of this moving unit 213. During this read scanning, light reflected from the document sheet is guided to each of mirrors 214, 215, 216, a lens 217, and to a CCD image sensor (hereinafter CCD) 218, and the image on the document sheet is formed on the image sensing plane of the CCD 218. The CCD 218 converts an image formed on the image sensing plane to an electrical signal, and the electrical signal is input to the controller unit 2000 after undergoing predetermined processing.

The printer 2095 has a laser driver 321, and the laser driver 321 drives a laser emitting unit 322 based on image data input from the controller unit 2000. By this, laser light corresponding to the image data is emitted from the laser emitting unit 322, and this laser light is swept and irradiated onto a photosensitive drum 323. By this, an electrostatic latent image is formed on the photosensitive drum 323 by the irradiated laser light, and this electrostatic latent image is made visible as a toner image by toner provided by a developer 324. From each cassette 311 or 312, a recording paper (sheets) is fed and conveyed between the photosensitive drum 323 and a transfer unit 325 through a conveyance path in synchronization with the laser light irradiation timing, and the transfer unit 325 transfers the toner image on the photosensitive drum 323 to the sheet.

A sheet onto which a toner image is thus transferred is fed to a pair of fixing rollers (a heating roller and a pressurizing roller) 326 by a conveyance belt, and the pair of fixing rollers 326 hot-press the sheet and fix the toner image onto the sheet. A sheet which has passed through the pair of fixing rollers 326 is discharged to a discharge unit 330 by a pair of discharge rollers 327. The discharge unit 330 is composed of a sheet processing apparatus capable of executing post-processing such as sort, staple, etc.

Also, when double-sided printing mode is set, after a sheet is conveyed to the pair of discharge rollers 327, the rotational direction of the pair of discharge rollers 327 is reversed, and the sheet is directed through a re-feeding path 339 by a flapper 328. A sheet thus directed to the re-feeding path 339 is re-fed between the photosensitive drum 323 and the transfer unit 325 at the aforementioned timing, and a toner image is transferred to the backside of the sheet.

The hardware compositions of the aforementioned devices A through G and K of FIG. 1 are similar to the composition of this MFP in FIG. 3. However, as mentioned above, only the device E has a difference in that the discharge unit of the device E includes a saddle stitch staple function in addition to sort, staple, etc.

Figures 4, 5, 6, 7:
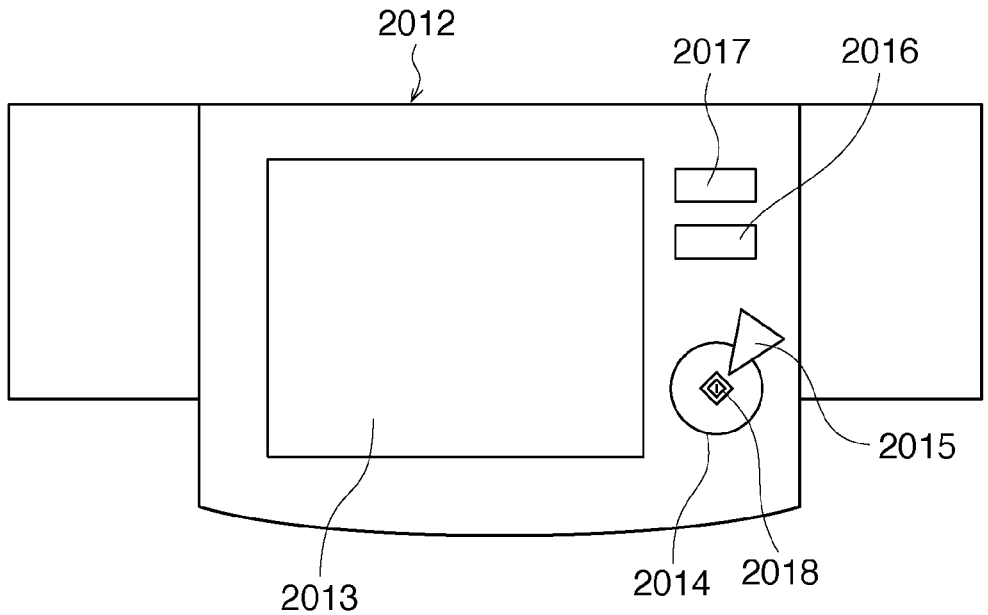
FIG. 4 depicts a plan view illustrating an external view of a console unit of the MFP according to the present embodiment.
FIG. 5 depicts a view illustrating an example of a neighboring device list registered in a device A, which describes neighboring devices capable of cooperating with the device A.
FIG. 6 depicts a view illustrating an example of a neighboring device list registered in a device B, which describes neighboring devices to the device B.
FIG. 7 depicts a view illustrating an example of a neighboring device list registered in a device C, which describes neighboring devices to the device C.

FIG. 4 depicts a plan view illustrating an external view of the console unit 2012 of the MFP according to the present embodiment.

A display unit 2013 is composed of a touch panel mounted on an LCD, and in addition to displaying a console screen of the MFP, forwards position information to the controller unit 2000 of the CPU 2001 when a key displayed on that display is pressed. A start key 2014 is used to start operation of read out of a document sheet image, etc. In the central portion of the start key 2014, a two-color LED 2018, green and red, is installed. When the green color is lit, a state in which the start key 2014 can be used is indicated, and when the red color is lit, a state in which the start key 2014 cannot be operated is indicated. A stop key 2015 is operated to stop operation while running. An ID key 2016 is used when a user inputs a user ID. A reset key 2017 is used when initializing settings from the console unit 2012.

FIG. 5 depicts a view illustrating an example of a neighboring device list registered in the device A, which describes neighboring devices capable of cooperating with the device A.

In FIG. 5, the device B, device C and device D are registered in the order of neighboring devices 1 through 3, as the neighboring devices of the device A.

FIG. 6 depicts a view illustrating an example of a neighboring device list registered in the device B, which describes neighboring devices to the device B.

In FIG. 6, the device E, device F and device G are registered in the order of neighboring devices 1 through 3.

Also, FIG. 7 depicts a view illustrating an example of a neighboring device list registered in the device C, which describes neighboring devices to the device C.

In FIG. 7, a device A and device B are registered in the order of neighboring devices 1 through 2.

<Search Management by Search Path>

If a search request from a device A to a device B is issued, the search path is represented as Path=A, and when a search request from the device B to a device E is further issued, the search path is represented as Path=AB.

Further, if a search request from the device A to the device C is issued, and a search request from the device C to the device A is further issued, this search path is represented as Path=AC. However, in this case, because the device A already exists in the search path, a search request to the device B is executed without executing the search from the device C to the device A. The search path in this case becomes Path=AC. Also, if a search path from the device B is further executed, the search path is represented as Path=ACB.

<Search Management by Search Distance>

If a search request for a function $\alpha$ at a search distance L=2 from the device A is issued, a capability notification request which arrives at the device B is as follows.

Path=A, $\alpha$, L=2

Next, when a search request from the device B is further issued, this search distance L is decremented by 1. For example, if a search request from the device B to the device E is executed based on the search request from the device A, the capability notification request becomes as follows.

Path=AB, $\alpha$, L=1

Further, if the device E does not have the function $\alpha$, and when a device search is further executed, the search distance L becomes "0" when it is decremented by 1. For this reason, the aforementioned search request is not executed, and a response that the function $\alpha$ does not exist in this path is returned. A detailed search step will be explained in the following search step.

Moreover, a method of controlling the search distance by subtracting from the search distance L was explained. However, the present embodiment is not limited to this, and a method of comparing a search path length with the search distance L is also conceivable.

Figure 8:
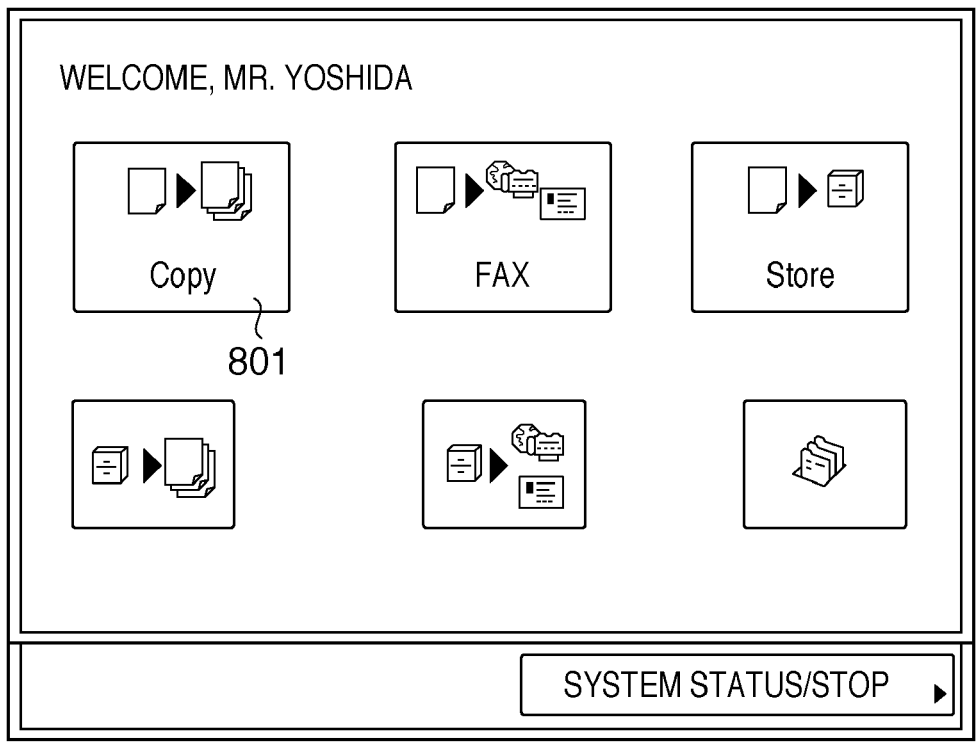
FIG. 8 depicts a diagram illustrating an example of a console screen displayed on a display unit of a console unit of the MFP according to the present embodiment.

FIG. 8 depicts a diagram illustrating an example of a screen displayed on the display unit 2013 of the console unit 2012 of the MFP according to the present embodiment.

Here, buttons which indicate each function are displayed, and in the explanation below, a case in which a copy button 801 is pressed and an instruction to execute a copy operation is given will be explained.

Figure 9:
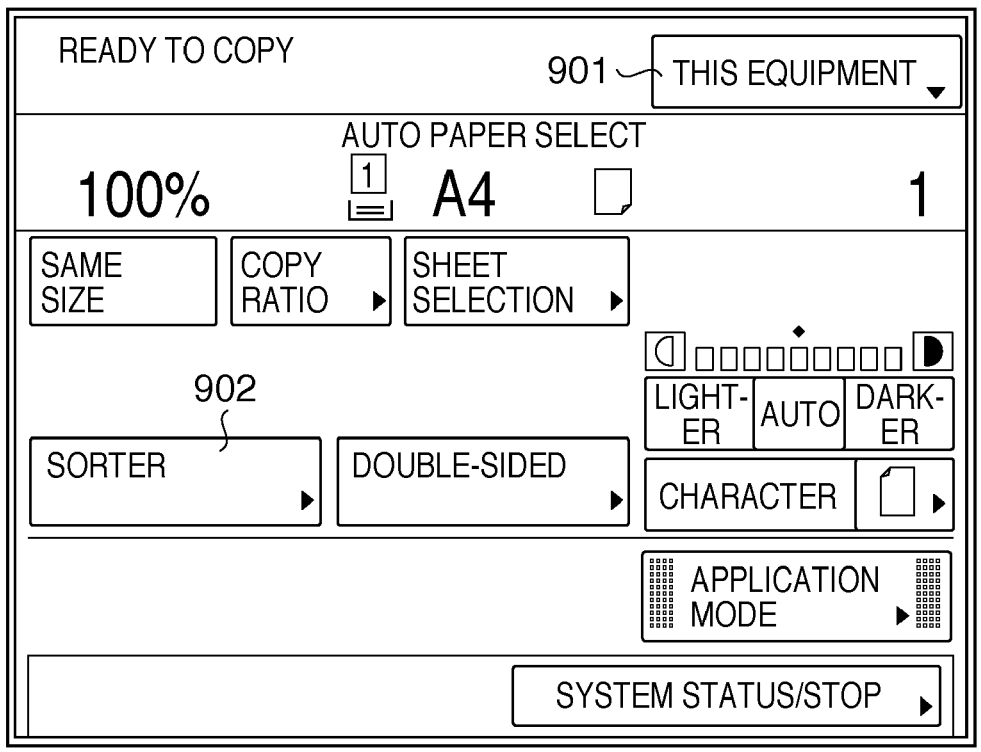
FIG. 9 depicts a diagram illustrating an example of a copy function setting screen displayed when a copy function is given on a function menu (FIG. 8) of a device A.

FIG. 9 depicts a diagram illustrating an example of a copy function setting screen displayed when the copy button 801 is pressed on a function menu (FIG. 8) of the device A. In the figure, on an execution equipment indicator 901, "this equipment", which represents that the device A executes the copy function, is set.

In the device A according to the present embodiment, for example, simple corner stapling can be executed, but a saddle stitch stapling which stitches the center of the sheets and folds them in half cannot be executed.

Figure 10:
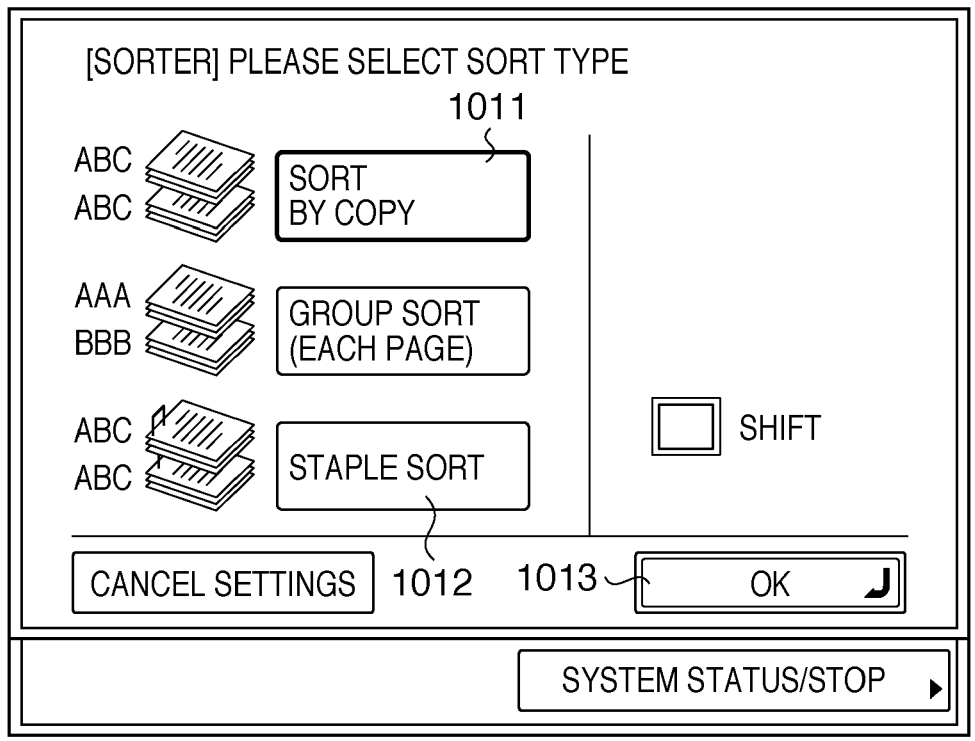
FIG. 10 depicts a diagram illustrating an example of a setting screen of a sorter.

If a sorter 902 is designated in FIG. 9, a sorter setting screen shown in FIG. 10 is displayed.

FIG. 10 depicts a diagram illustrating an example of a setting screen of a sorter.

In an initialization screen of this sorter setting screen, sort (each set) 1011 which does not execute stapling is set. Here, if a staple sort 1012 is selected and an OK button 1013 is pressed, a staple sort is selected.

Figure 11:
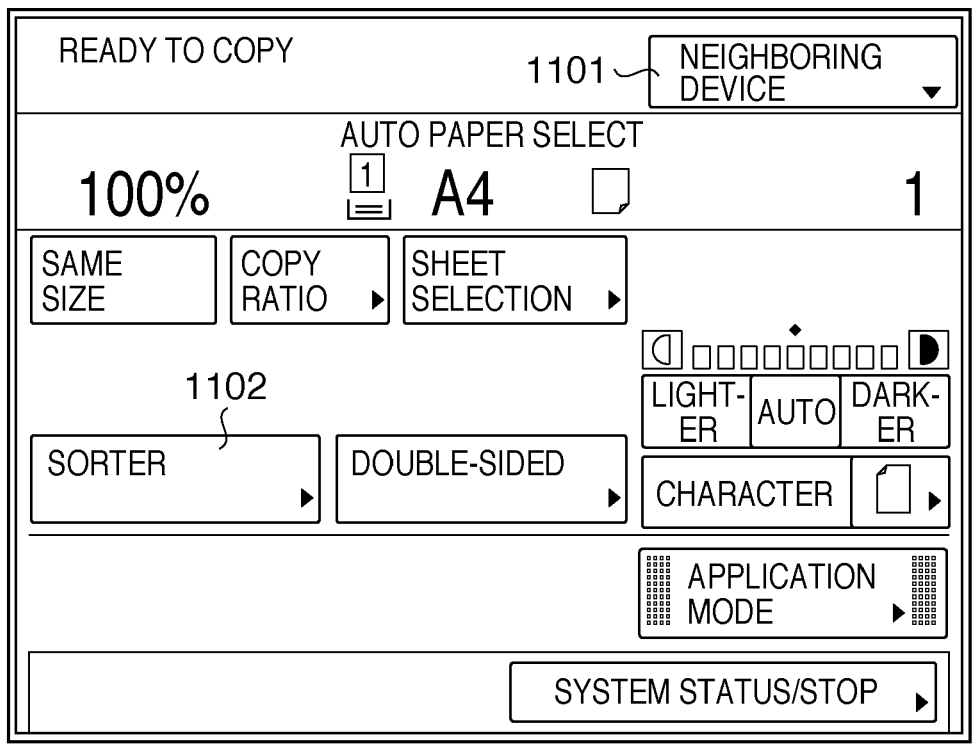
FIG. 11 depicts a diagram illustrating an example of an initial operation screen when an instruction for copy operation is given.

Also, in FIG. 9, a user manipulates an execution equipment indicator 901 and sets "neighboring device" in the execution equipment indicator, as shown by reference numeral 1101 in FIG. 11. If a sorter 1102 is selected in this state, the screen becomes as in FIG. 12.

FIG. 11 depicts a diagram illustrating an example of an initial operation screen when an instruction for a copy operation is given. In FIG. 11, the execution equipment indicator shows "neighboring device".

Figure 12:
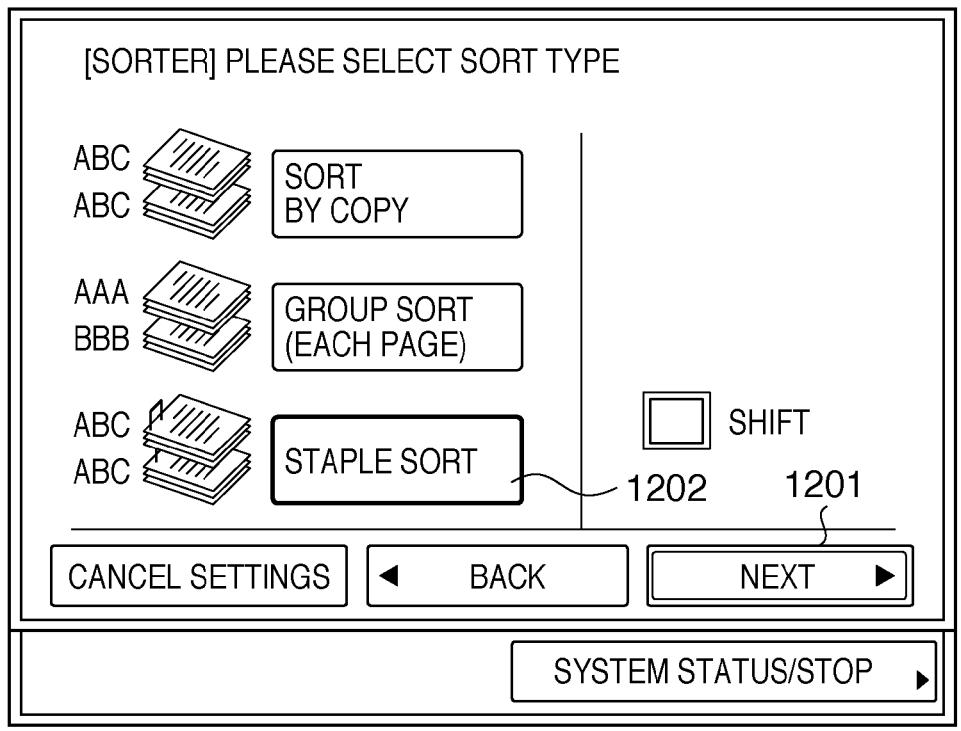
FIG. 12 depicts a view illustrating an example of a sorter setting screen when staple sort is selected.

FIG. 12 depicts a view illustrating an example of a sorter setting screen in a case that the sorter 1102 is pressed in FIG. 11, and staple sort is selected.

Figure 13:
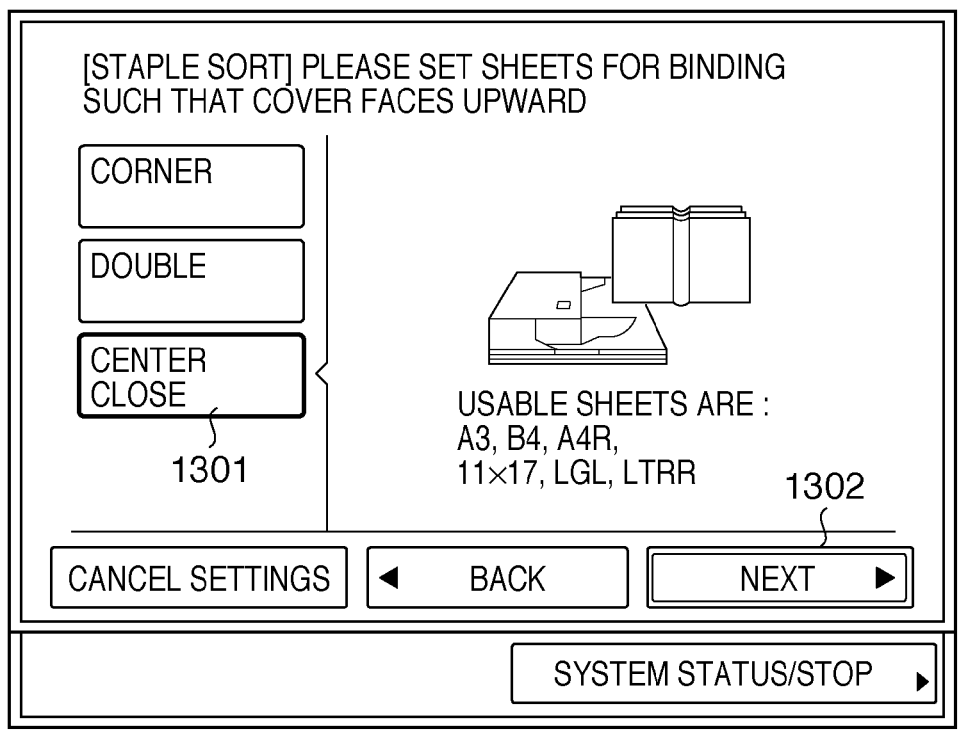
FIG. 13 depicts a view illustrating an example of a screen for setting a staple position for staple sort.

In FIG. 12, a staple sort 1202 is selected, and pressing "Next" 1201 to further call out a setting screen leads to the setting screen of FIG. 13.

FIG. 13 depicts a view illustrating an example of a screen for setting a staple position for staple sort.

In FIG. 13, a saddle stitch 1301 is selected. If "Next" 1302 which further calls out the next selection screen is designated, because the device A can not execute the saddle stitch stapling as previously mentioned, a device capable of executing the saddle stitch stapling is searched according to the search step shown below.

Figure 14:
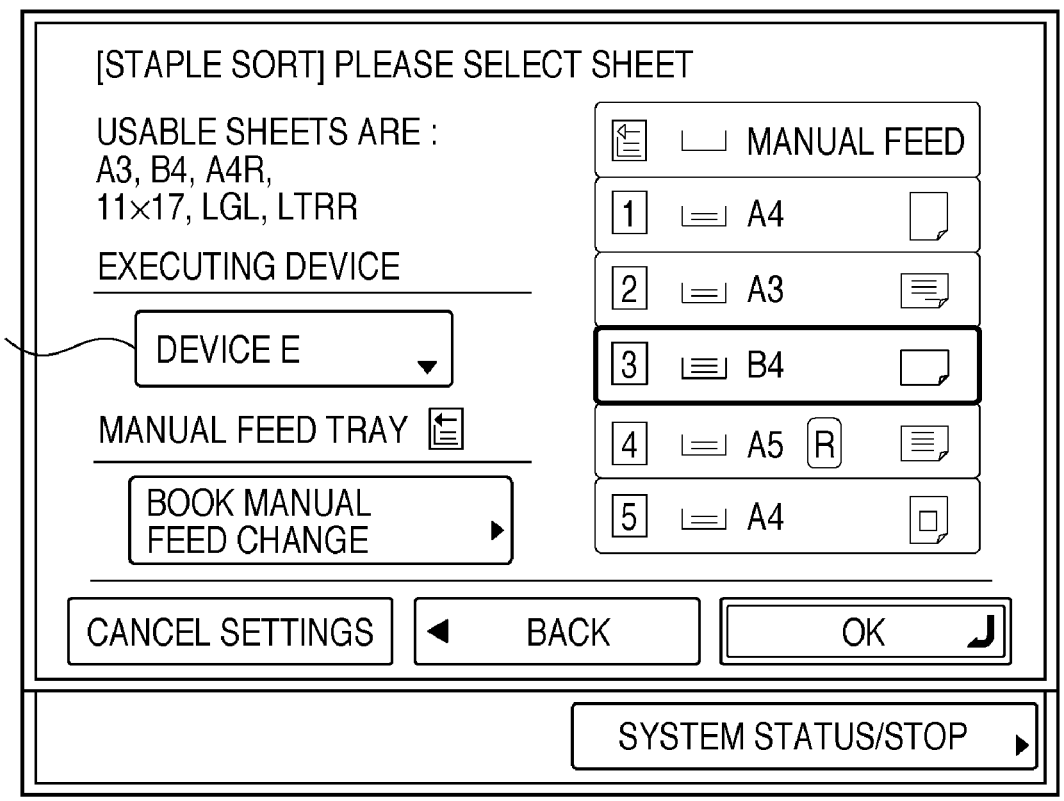
FIG. 14 depicts a diagram illustrating a setting screen example of a staple sort function of a device E in a case that the device E is searched.

FIG. 14 depicts a diagram illustrating a setting screen example displayed on a console unit of the device A which sets a staple sort function of the device E when the device E is thus searched in the device A.

Here, an execution equipment indicator 1401 is coupled with the execution equipment indicator 901 of FIG. 9. Here, currently, the set function (saddle stitch staple sort) can be executed, and the device E with the highest priority ranking in the indicated search order is set, and the function is displayed.

<Explanation of Search Processing>

Figure 15:
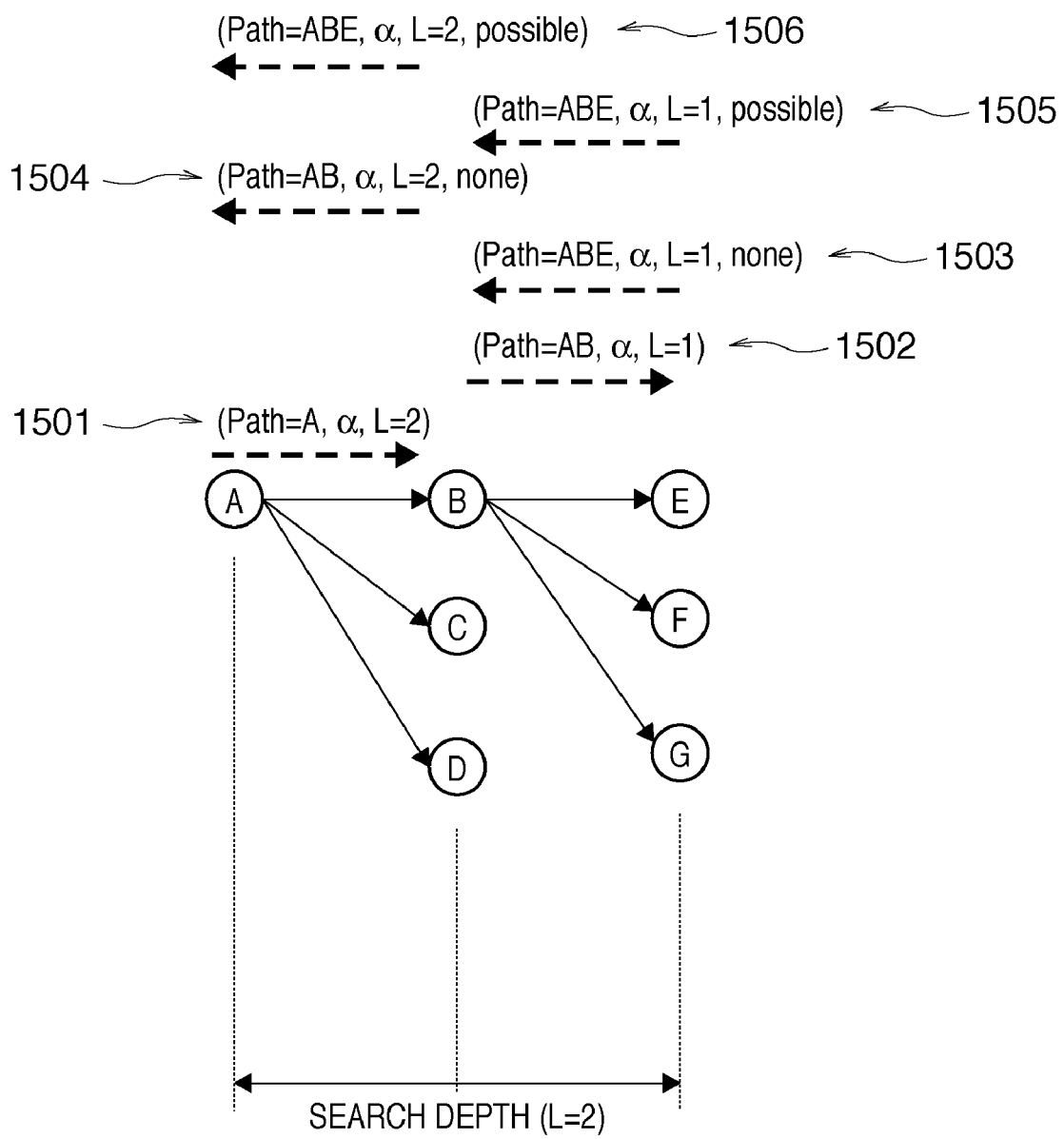
FIG. 15 depicts a diagram describing search processing from a device A according to a first exemplary embodiment.

FIG. 15 depicts a diagram describing search processing from the device A according to the first embodiment.

(1) A device B, device C and device D are registered in a neighboring device list of the device A.

(2) In a state in which function cooperation through a network is given, a user of the device A gives an instruction for a saddle stitch staple function (hereinafter indicated as α), as previously mentioned. By this, the device A searches for a device having the function α with a search distance L as "2" based on the neighboring device list registered in the device A. Here, the device A sends a capability notification request (Path=A, α, L=2) to the device B with the highest priority ranking (FIG. 5).

(3) The device B which received the capability notification request returns "no function" (Path=AB, α, L=2, none) 1504 to the device A which is the sending origin if its own device (the device B) is included in the search path of the capability notification request and has not the function α. Further, if its own device is not included in the search path of the capability notification request and the its own device has not the function α, then the device B adds itself to the search path and registers (Path=AB, α, L=1) in the search list. Next, using its own (the device B's) neighboring device list (the devices E, F, G), similarly to reference numeral 1501, a capability notification request (Path=AB, α, L=1) 1502 is issued to neighboring devices (the devices E, F, G).

(4) At this time, if the device E does not have the function α, because the search length L is "1", "no function" (Path=ABE, α, L=1) 1503 is returned to the device B without executing the aforementioned search. The other devices F and G execute similar processing.

If the device B thus receives "no function" from all of the neighboring devices E, F and G, then the device B refers to the search list and searches for an item of the function α, and acquires (Path=AB, α, L=1). A capability notification (Path=AB, α, L=2, none) 1504 indicating that no device having the function α was found by the device B is thus returned to the device A.

(5) On the other hand, if the device E has the function α, device information of the device E and the function α are returned as a capability notification (Path=ABE, α, L=1, possible) 1505 to the device B.

(6) Thus, if the device B receives a capability notification for the neighboring device E, it refers to a search list, and returns a capability notification (Path=ABE, α, L=2, possible) 1506 to the device A.

Such operation is similarly executed by the devices C and D, and a capability notification is returned to the device A from the devices C and D.

(7) If the device A thus receives capability notifications from the neighboring devices (B, C, D), and there is a plurality of devices having the function α, then a list of the devices is created and presented to a user. Also, if a requested function β is further added, a capability notification including the function β is sent directly to the devices in the list.

A neighboring device list is thus referenced, and a device having a predetermined function can be searched through neighboring devices of a device from that device.

<Job Execution>

A saddle stitch staple job from the device A to the device E is booked by the operation and search step explained above.

Then, if a user designates copy and saddle stitch stapling on the console unit 2012 of the device A and presses the start key 2014, read out of an original document by the scanner 2070 of the device A is started. Image data thus acquired is sent from the device A to the device E along with print settings of a job including saddle stitch stapling by the network I/F 2010 through the networks 1001 and 1002.

By this, the device E stores the print settings received through the network I/F 2010 in the RAM 2002, and sets these printer settings in the printer 2095. Then, the image data received through the network I/F 2010 is output by the printer 2095 through the image bus I/F 2005, and printing is executed. By this, the printer 2095 of the device E executes saddle stitch stapling on each set according to settings received from the device A.

Figure 16:
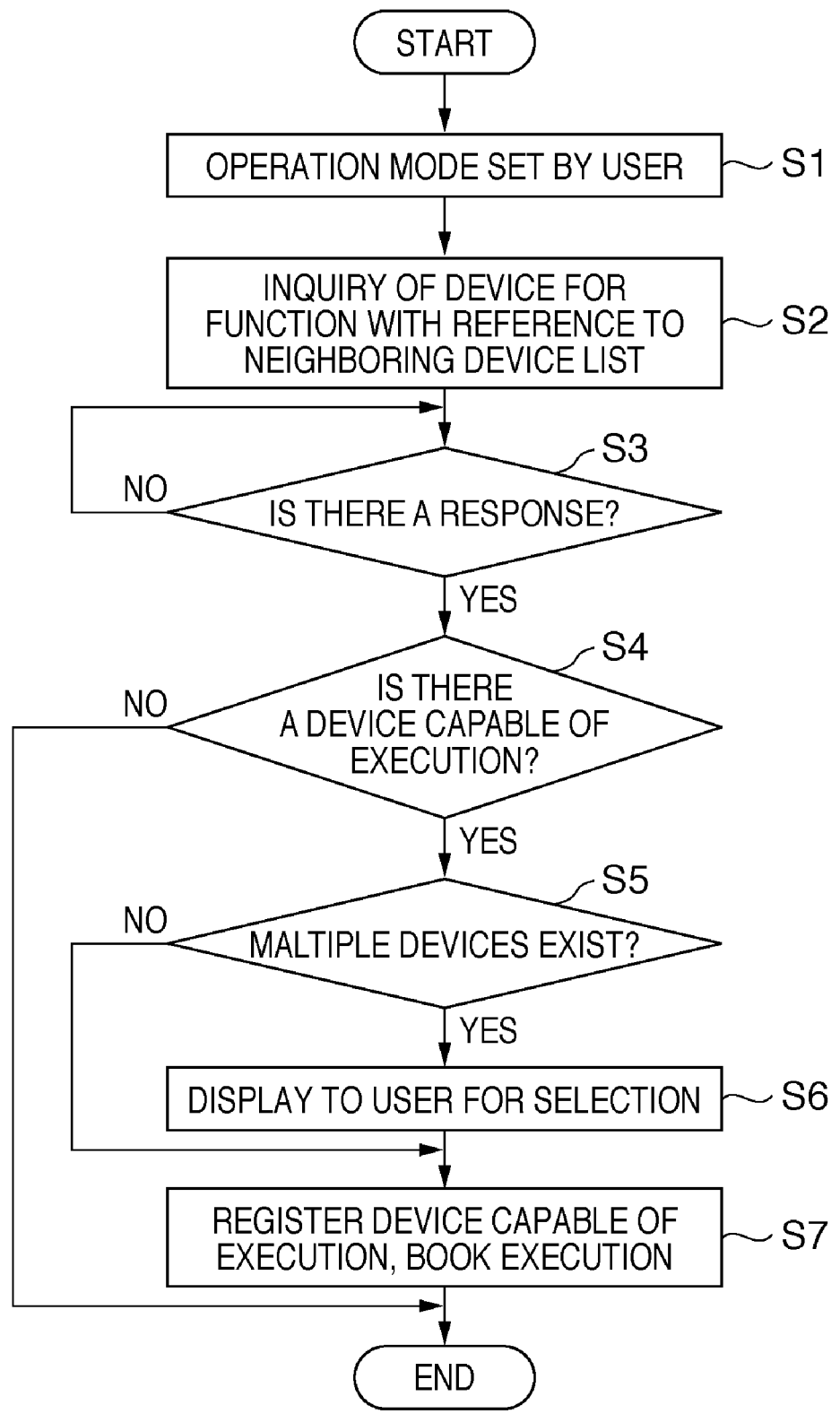
FIG. 16 depicts a flowchart describing processing of a device A according to the first embodiment.

FIG. 16 depicts a flowchart describing processing of the device A according to the first embodiment, and a program which executes this processing is stored in the ROM 2003 and the processing is implemented under the CPU 2001 in accordance with the program.

First, in step S1, a user sets an operation mode or post-processing such as the aforementioned saddle stitch stapling using the console unit 2012 of the device A. Next, the process advances to step S2, a neighboring device list is referred to, and an inquiry of whether or not the function exists is made to neighboring devices in the neighboring device list. This corresponds to the issuance processing of the aforementioned capability notification request 1501 of FIG. 15. Then in step S3, a response to the notification request is awaited. Once there is a response, the process advances to step S4, and it is determined whether or not there is a device which can execute the function. If there is no such device, processing ends without being able to execute the function, but if a device that can execute the function exists, the process advances to step S5, and it is determined whether a plurality of devices exist. If it is determined in step S5 that multiple devices exists, then the process advances to step S6, a list of the multiple devices is displayed on the display unit 2013 of the console unit 2012, and the CPU 2001 causes a user to select a device of the multiple devices as an execution target. Then the process advances to step S7, and the selected device, or the device determined to be the only existing device in step S5, is registered as a device capable of executing the function. Also, the device is booked to execute the function.

Figure 17:
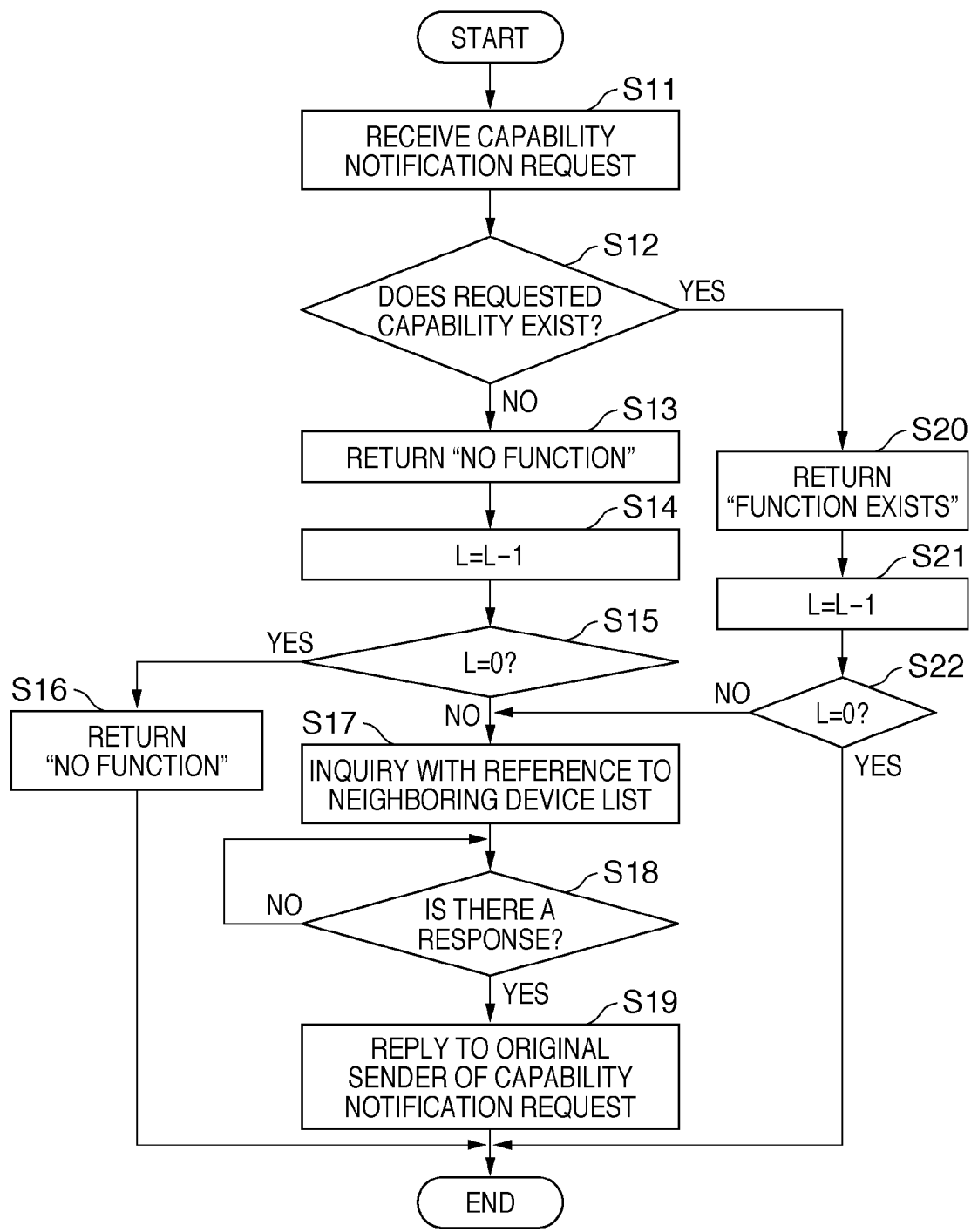
FIG. 17 depicts a flowchart describing processing of a device which received a capability notification request from a device A according to the first embodiment.

FIG. 17 depicts a flowchart describing processing of a device (for example, the aforementioned device B) which received a capability notification request from the device A according to the first embodiment, and a program which executes this processing is stored in, for example, a ROM 2003 of the device B.

In step S11, when a capability notification request is received from the device A, the process advances to step S12. In step S12, it is determined whether or not its own device (device B) is included in the search path of the capability notification request and the requested capability exists in the device (device B). If it is determined in step S12 that its own device is not included in the search path or the requested function does not exist, the process advances to step S13 and returns "no function" to the sending device (device A). Next, the process advances to step S14, and the search distance L included in that capability notification request is decremented by 1. Then in step S15, it is determined whether or not the search distance L becomes "0". If the search distance L becomes "0", then the process advances to step S16, and because further search cannot be done, "no function" is returned to the sending source (the device A in the aforementioned example).

On the other hand, in step S15, if the search distance L is not "0", the process advances to step S17, a neighboring device list is referred to, and an inquiry of whether or not the neighboring devices have the function is made. This corresponds to, for example, the aforementioned issuance processing of the capability notification request 1502 of FIG. 15. Then in step S18, a response to the notification request is awaited. If there is a response the process advances to step S19, and based on the response, a response is returned to the sending source of the capability notification request or to the device which sent the request (for example, corresponding to reference numerals 1503 through 1506 of FIG. 15). In this step S19, for example, if the device B receives "no function" from all of the neighboring devices E, F and G, a capability notification indicating that no device having that function α was found (Path=AB, α, L=2, none) is returned to the device A. Here, at the end of the search path, "B" which indicates that the device B has been traversed is added.

Also, if it is determined in step S12 that the its own device (device B) is included in the search path and the requested function exists in the its own device, the process advances to step S20, and a response that the its own device has the function is returned to the sending source (device A) of the capability notification request. This processing may terminate at this point, but, for example, step S21 and beyond given below may also be executed. That is, in step S21, the search distance L included in the capability notification request is decremented by 1. Then in step S22, it is determined whether the distance L becomes "0". If it becomes "0", the processing terminates there, but if it is not "0", the process may advance to step S17. In this manner, a plurality of devices having the requested capability may be searched, and the number of selections selectable by a user in step S6 of FIG. 16 can be increased.

According to the first embodiment explained above, in accordance with an instruction from a user of a first device, a list of devices located in the neighborhood of the first device is referred to, and further, within those devices, whether or not a device which can execute the function requested by the user exists can be confirmed. Then, if a second device which can execute the function is found, then the first device can execute the function requested by the through cooperation with the second device.

Second Embodiment

Figure 18:
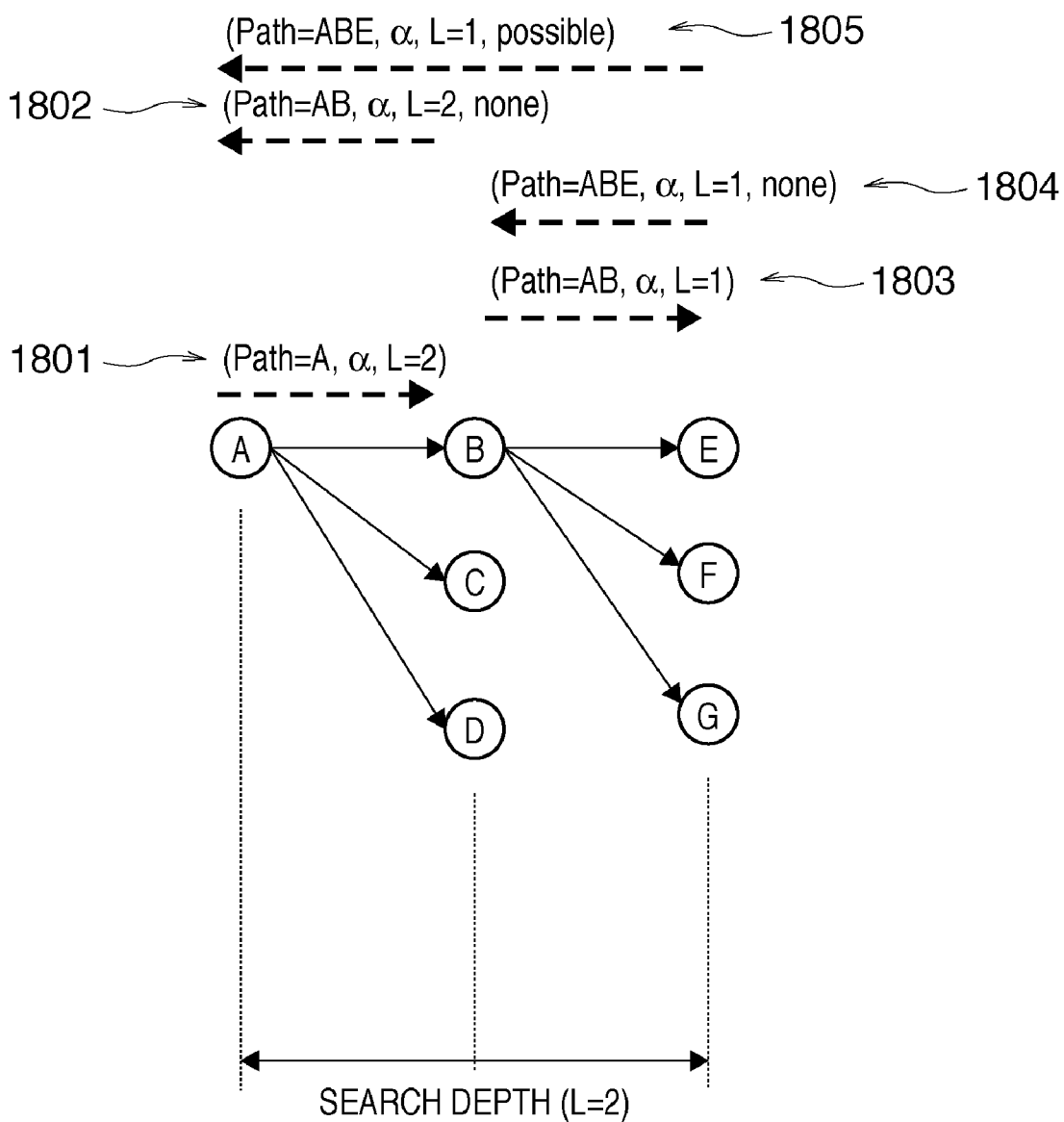
FIG. 18 depicts a diagram describing search processing from a device A according to a second exemplary embodiment.

FIG. 18 depicts a diagram describing search processing from a device A according to the second embodiment. Moreover, in the second through fifth embodiments hereinafter explained, because each device (MFP) has the same composition as the MFP according to the aforementioned first embodiment, an explanation thereof will be omitted.

(1) A device B, device C and device D are registered in a neighboring device list of the device A.

(2) The user of the device A gives an instruction for cooperation through a network, and the user designates, for example, a saddle stitch stapling function (α) which only the device E has. In this case, because the device A cannot execute the function, it refers to the neighboring device list registered within in the device A, and issues a capability notification request with the function α and search distance L=2 (Path=a, α, L=2) 1801 to devices registered in the neighboring device list.

(3) The device B which received the capability notification request (Path=A, α, L=2) 1801 determines whether or not its own device (device B) is included in the search path of the capability notification request. If it is included, because the device B does not have this function α, the device B returns "no function" to the device A (Path=AB, α, L=2, none) 1802. Also, if its own device (device B) is not in the search path of the capability notification request, or if its own device (device B) does not have the request function α, the device B adds itself to the search path and registers (Path=AB, α, L=1) in the search list. Then, the neighboring device list of the device B (the devices E, F, G) is referred to, and a capability notification request (Path=AB, α, L=1) 1803 is issued to the neighboring devices of the device B.

(4) If the device E does not have the function α, because the search distance L is 1, "no function" (Path=ABE, α, L=1, none) 1804 is returned to the device B without executing the above search.

(5) When the device B receives "no function" from all neighboring devices (devices E, F, G), it refers to the search list, and searches for a notification request in which the function of the searched target is the function α. Then, a capability notification (Path=AB, α, L=2, none) 1802 indicating that the requested function α exists neither in the device B nor in any of its neighboring devices is returned to the device A.

(6) In the case that the device E has the function α, device information of the device B and a capability notification of the function α (Path=ABE, α, L=1, possible) 1805 are directly returned from the device E to the device A.

(7) Thus, the device A receives a capability notification from neighboring devices (devices B, C, D). Then, in the case that there are a plurality of devices having the function α, a list thereof is created and presented to a user for selection at the device A. Furthermore, if a function β is further requested, a capability notification request can be issued directly to the devices included in the list.

Thus, according to the second embodiment, a device having a requested function (here, the device E) directly returns a capability notification 1805 to the device A.

Third Embodiment

In the aforementioned first embodiment, a case in which search is started in accordance with a user's instruction was explained, but in the third embodiment, an example in which search is started when a device (a device A) cannot execute a requested function by itself will be explained. This can be realized by, in the aforementioned step S1 of FIG. 16, it is determined whether or not a device (a device A) A can execute a function requested by a user by itself, and if it is determined that it cannot execute the function, the processing is executed from step S2.

In the device A of the third embodiment, while simple corner stapling can be executed, advanced saddle stitch stapling in which the center of the sheets is closed by a process called saddle stitching, and the sheets are folded in half cannot be executed. Then, similarly to the first embodiment, if the saddle stitch stapling is selected, a search operation is started similarly to the first embodiment, and if a device E capable of the saddle stitch stapling is found, then a screen such as that shown in FIG. 14 is displayed. Here, an execution equipment indicator 1401 is coupled with the execution equipment indicator 901 of FIG. 9.

Figure 19:
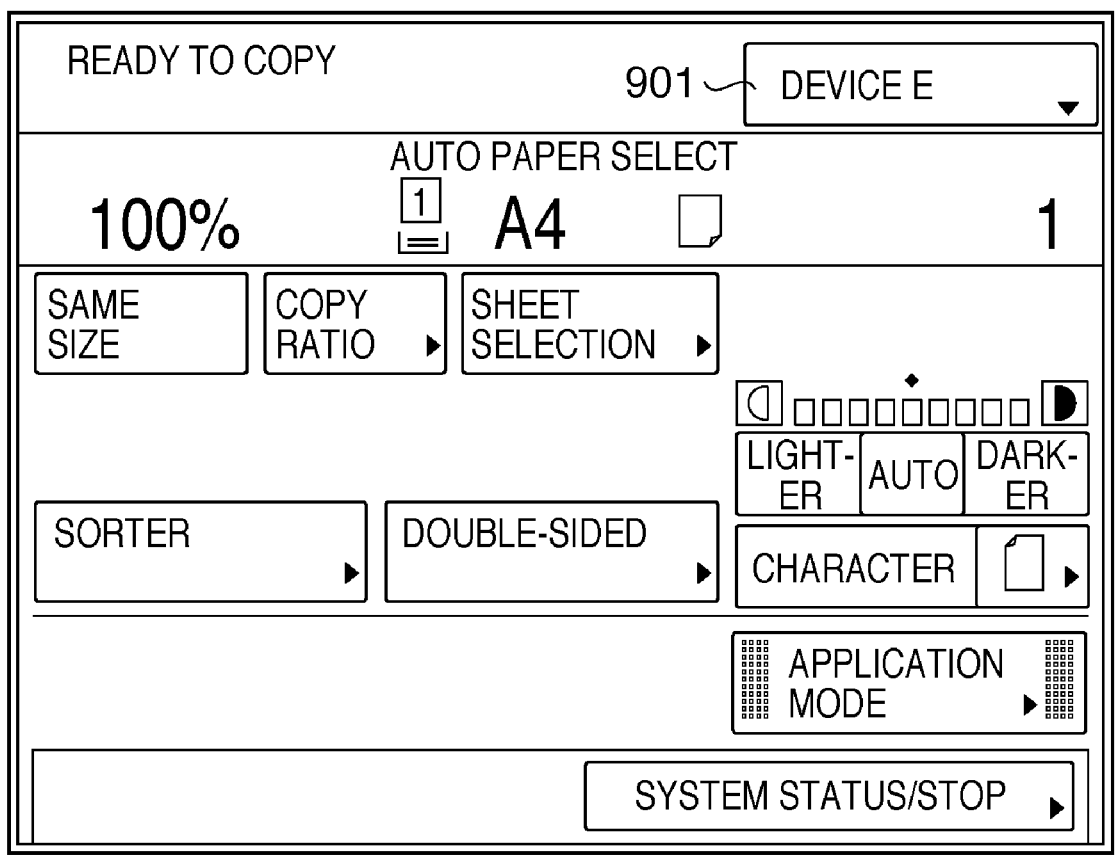
FIG. 19 depicts a diagram illustrating an example of an initial operation screen in a case that an instruction for a copy operation is given according to a third exemplary embodiment.

FIG. 19 depicts a diagram illustrating an example of an initial operation screen when an instruction for a copy operation is given according to the third embodiment, and here "device E" is displayed on the execution equipment indicator 901.

Fourth Embodiment

In the aforementioned first embodiment, when searching for a function, an example of inquiring from the top of a neighboring device list was explained. In contrast to this, in the fourth embodiment, capabilities of a neighboring device list are known in advance, and an example in which a capability notification request is issued without executing search if the capability is executable will be explained.

<Acquisition of Capabilities of Neighboring Devices>

When a power supply is input to a device A, a capability notification request is issued to each device registered in a neighboring device list (the devices B, C, D). Each neighboring device which receives the capability notification request gives a notification of each device in accordance with a function bit array such as that shown in FIG. 20.

FIG. 20 depicts a diagram illustrating an example of capability information received from an apparatus in a neighboring device list of a device A according to the fourth embodiment. The left-hand bit in the figure indicates the highest ranking bit.

FIG. 21 depicts a diagram explaining the meaning of each bit in function information according to the fourth embodiment.

In FIG. 20 and FIG. 21, it is known that, for example, a device B has double-sided print, staple, color print, and scanner functions. Also, a device C has double-sided print and scanner functions. Furthermore, it is known that a device D has double-sided print, staple and scanner functions.

After receiving such function information, the device A stores capabilities of each device in the neighboring device list of the device A.

Then, if a function is requested by a user, the device A refers to the neighboring device list, and determines whether or not the device A has the requested function or at least one of the neighboring devices has the function. Then, a device search over a network is executed only if none of the devices including the device A have the function. The method of search in this case is similar to the aforementioned embodiments.

Fifth Embodiment

In the aforementioned first embodiment, the future search path of a request was not changed regardless of which search path was followed, but in the fifth embodiment, an example in which a device to execute an inquiry is determined from a neighboring device list based on a search path will be explained.

FIG. 22 depicts a diagram illustrating an example of a neighboring device list of a device B according to the fifth embodiment.

In the device B, from which device a search originated is determined from the search path. Then, only when there is a device set as being allowed to be searched in the search path, the search request is executed on the neighboring devices that are allowed to be searched. In the example of FIG. 21, a device E allows search only from the device A, and the device F allows search from the devices A and E. Further, a device G indicates that search from any device is allowed.

For example, in the case of a search request from the device A, the search request is issued for all devices (the devices E, F, G) registered in the neighboring device list of the device B. However, in the case of a search request from the device C, the search request is issued only for the device G, because the devices E and F are not allowed to be searched from the device C.

Moreover, devices maintained in a neighboring device list and each device registered in the neighboring list are, of course, grouped as devices capable of cooperating with devices which can be traced through the neighboring device lists of each device. That is, each grouped device is added to a neighboring device list in consideration of operational conditions such as cost management, etc. Of course, grouping may be done without consideration of such operational conditions, and in such a case, whether or not such conditions are met may be confirmed before determining devices for cooperation.

Other Embodiments

The present invention directly or remotely provides a software program which realizes functions of the aforementioned embodiment to a system or a device, and may be achieved by a computer of that system or device which reads out and executes the provided program. In this case, the form of the program is not particularly limited as long as it has the function of a program.

Therefore, the program code itself installed in a computer to implement the functional processing of the present invention using the computer implements the present invention. That is, the claims of the present invention include the computer program itself for implementing the functional processing of the present invention. In this case, the form of the program is not particularly limited, and an object code, a program to be executed by an interpreter, script data to be supplied to an OS, and the like may be used as long as they have the program function.

As a recording medium for supplying the program, various media can be used: for example, a floppy® disk, hard disk, optical disk, magneto-optical disk, MO, CD-ROM, CD-R, CD-RW, magnetic tape, non-volatile memory card, ROM, DVD (DVD-ROM, DVD-R), and the like.

As another program supply method, a program can be supplied by establishing a connection to a home page on the Internet using a browser of a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, a user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the read out program code by the computer. For example, an OS or the like running on the computer may execute some or all of the actual processes based on an instruction of that program, thereby implementing the functions of the aforementioned embodiments.

Furthermore, the program read out from the recording medium may be written in a memory equipped on a function expansion board or a function expansion unit, which is inserted into or connected to the computer. In this case, after the program is written in the memory, a CPU or the like equipped on the function expansion board or unit executes some or all of the actual process based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-099801, filed Apr. 7, 2008, which is hereby incorporated by reference herein in its entirety.

What is claimed is:

1. A network system including a first network device storing a list of first devices determined by a user in advance and a second network device included in the list of the first devices, the second network device storing a list of second devices determined by the user in advance,
wherein the first network device comprising:
a scanning unit reading a document and generating image data;
an inquiry unit, when an instruction to execute a predetermined printing function is given, issuing a notification request inquiring whether or not the predetermined printing function is capable of being executed to devices included in the list of first devices, wherein the notification request includes range information indicating a range over which the notification request is issued;
a display unit displaying a list of devices which are capable of executing the predetermined printing function based on each reply to the notification request; and
a first transmission unit transmitting the image data generated by the scanning unit and an instruction to execute the predetermined printing function to a device selected by a user among the list of devices displayed by the display unit;
wherein the second network device comprising:
a printing unit executing a printing process; and
a second transmission unit transmitting a reply indicating whether the predetermined printing function is able to be executed to the first network device, when the notification request is received by the second network device, and transmitting the notification request to devices included in the list of second devices in accordance with the range information included in the notification request.

2. A system according to claim 1, wherein the list of first devices is a list of devices which are able to execute a function in cooperation with the first network device, and the list of second devices is a list of devices which are able to execute a function in cooperation with the second network device.

3. A system according to claim 1, wherein the list of first devices are determined by the user based on a physical positional relationship with the first network device, and the list of second devices are determined by the user based on a physical positional relationship with the second network device.

4. A system according to claim 1, wherein the first network device further comprising a reception unit receiving a reply indicating whether or not the predetermined printing function is able to be executed from each device included in the list of second devices.

5. A system according to claim 1, wherein the second network device further comprising a forwarding unit receiving a reply from each device included in the list of second devices in response to the notification request and forwards each reply to the first network device, and
the first network device further comprising a reception unit receiving the each reply forwarded by the forwarding unit.

6. A system according to claim 1, wherein the transmission unit transmits the notification request whose range information has been modified.

7. A system according to claim 1, wherein the range information included in the notification request indicates a number of devices which pass from an originating device to a destination device.

8. A method of controlling a network system including a first network device storing a list of first devices determined by a user in advance and a second network device included in the list of the first devices, the second network device storing a list of second devices determined by the user in advance, the method comprising:

> a scanning step, for the first network device, of reading a document and generating image data;
>
> an inquiry step, for the first network device, when an instruction to execute a predetermined printing function is given, of issuing a notification request inquiring whether or not the predetermined printing function is capable of being executed to devices included in the list of first devices, wherein the notification request includes range information indicating a range over which the notification request is issued;
>
> a display step, for the first network device, of displaying a list of devices which are capable of executing the predetermined printing function based on each reply to the notification request;
>
> a first transmission step, for the first network device, of transmitting the image data generated in the scanning step and an instruction to execute the predetermined printing function to a device selected by a user among the list of devices displayed by the display unit; and
>
> a second transmission step, for the second network device, of transmitting a reply indicating whether the predetermined printing function is able to be executed to the first network device, when the notification request is received by the second network device, and transmitting the notification request to devices included in the list of second devices in accordance with the range information included in the notification request.

* * * * *